March 16, 1965 C. B. ORR, JR 3,174,100

2-WIRE – 4-WIRE TELEPHONE CONVERTER FOR USE ON UNSTABLE 4-WIRE CIRCUITS

Filed Oct. 3, 1961 3 Sheets-Sheet 1

INVENTOR,
CHARLES B. ORR, JR.

BY Harry M. Saragovitz

ATTORNEY.

March 16, 1965 C. B. ORR, JR 3,174,100
2-WIRE - 4-WIRE TELEPHONE CONVERTER FOR USE ON UNSTABLE 4-WIRE CIRCUITS
Filed Oct. 3, 1961 3 Sheets-Sheet 2

INVENTOR,
CHARLES B. ORR, JR.

BY Harry M. Saragovitz

ATTORNEY.

March 16, 1965 C. B. ORR, JR 3,174,100

2-WIRE - 4-WIRE TELEPHONE CONVERTER FOR USE ON UNSTABLE 4-WIRE CIRCUITS

Filed Oct. 3, 1961 3 Sheets-Sheet 3

INVENTOR,
CHARLES B. ORR, JR.

BY Harry M. Saragovitz

ATTORNEY.

United States Patent Office 3,174,100

Patented Mar. 16, 1965

3,174,100

2-WIRE – 4-WIRE TELEPHONE CONVERTER FOR USE ON UNSTABLE 4-WIRE CIRCUITS

Charles B. Orr, Jr., 2502 Crest Drive, Annandale, Va.

Filed Oct. 3, 1961, Ser. No. 142,744
12 Claims. (Cl. 325—5)
(Granted under Title 35, U.S. Code (1952), sec. 266)

The invention described herein may be manufactured and used by or for the Government of the United States of America for governmental purposes without the payment to me of royalties thereon or therefor.

This invention relates generally to communication systems, and particularly to reliable two-wire four-wire interconnection means for use on unstable four-wire telephone circuits.

A "two-wire circuit" is one in which the operation is characterized by the use of the same path for transmission in both directions; and a "four-wire circuit" is one in which the transmission in one direction is carried on over a path different from that used for transmission in the other direction.

For many years the connecting of two-wire circuits to four-wire circuits has represented a serious problem. In situations where the two-wire circuit is a telephone line and the four-wire circuit involves a radio transmission path the problem is especially serious. Since the interconnection of two-wire circuits to four-wire circuits requires that all three circuits be connected together, a portion of the signal received by the four-wire receive circuit is retransmitted by the four-wire send circuit which under certain conditions causes regeneration or oscillation. Another problem present is that of instability. In a radio-telephone system, the four-wire circuit comprising the transmitter and receiver at two stations is unstable primarily because of the characteristics of the transmission path. Ionospheric disturbances, atmospheric conditions and the like, are ever present factors in determining the nature of the path.

Among the prior art "solutions" to the connection of two-wire circuits to four-wire circuits were the many systems utilizing hybrid coils. These were developed to prevent feedback from the receive to the send. In practice, the hybrid never completely eliminated the signal from the receive line from entering the transmit line and was operable with some success only when used with particular telephone lines and on circuits which were "quiet" and stable. Since high frequency radio systems are generally not quiet or stable, hybrid arrangements failed to provide a satisfactory solution to the problem.

Another approach to the switching of two-wire circuits to four-wire circuits was to provide voice-operated switches which would connect the telephone line to the receive four-wire line when the distant user talked. Although volume control devices were incorporated to automatically adjust talker volumes for understandable speech, the system was not too reliable. In radio-telephone systems when radio signals fade or become noisy the switching actions become erratic to the extent of connecting the two-wire line to the receiver continuously although no voice signals are present. It is also possible for both users to be talking at the same time and neither user hearing the other's conversation. Under these conditions the circuit is unusuable. Since such noise and fading conditions occur frequently, conversion equipments utilizing voice-operated relays require constant supervision and precise manual adjustment to keep the system functioning.

The invention hereinafter described in connection with the appended drawings overcomes the difficulties heretofore encountered in the use of two-wire four-wire circuits under conditions of noise and instability. The switching of the two-wire circuit to either the send or receive lines of the four-wire circuit is accomplished by means of a command signal which utilizes the frequency-shift idea which has proved itself very reliable in connection with high-speed printing telegraph systems. Greater reliability of switching can further be achieved through the use of space diversity for the command signal channels when the invention is utilized in radio-telephone circuits. Interference between the send and receive channels is eliminated. The converter incorporating the invention is reliable under all conditions where the four-wire circuit is usable on a four-wire basis.

It is accordingly a general object of the invention to provide a reliable two-wire four-wire interconnecting means for use in conjunction with unstable four-wire circuits.

With this and other objects in view, as will hereinafter more fully appear, and which will be more particularly pointed out in the appended claims, reference is now made to the following description taken in connection with the accompanying drawings in which:

Figure 1:
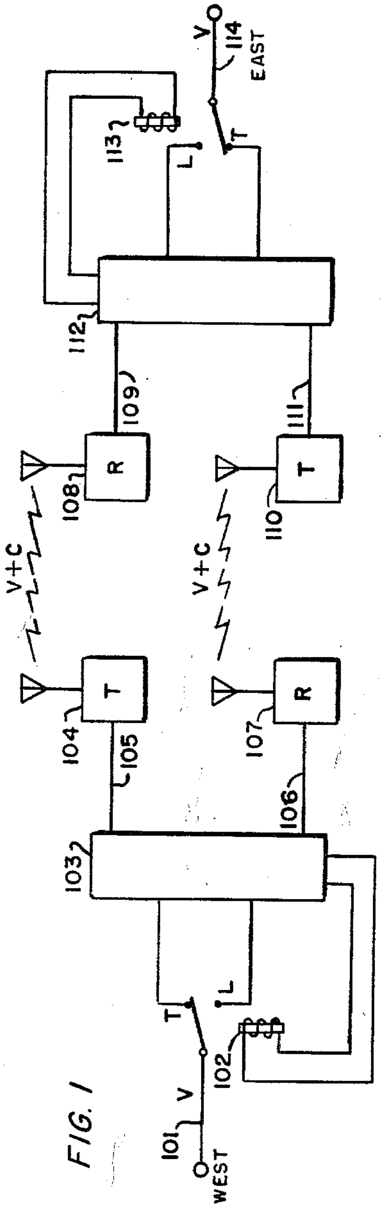
FIG. 1 shows diagrammatically, and in part schematically, the basic features of the invention.

Referring to FIG. 1 the incoming line 101 connects to the armature of a relay 102 which relay in its unenergized condition connects line 101 to the talk line T. Terminal unit 103 (to be described in detail in connection with FIGS. 2 and 3) embodies circuits which respond to any signal over line 101 to produce a command signal which is fed over line 105 to transmitter 104. The voice signal $v$ together with the command signal $c$ are radiated by transmitter 104. At a remote station the combined signal $v+c$ from transmitter 104 is received by radio receiver 108 and passed on to terminal unit 112. Terminal unit 112, like terminal unit 103, incorporates the necessary circuit by which the voice and command signals are separated. The command signal $c$, after passing through appropriate circuits, operates relay 113 thereby connecting terminal L to the outgoing line 114, thereby completing the west-east circuit for the voice signal $v$. When the west-east subscriber stops talking, relay 113 becomes de-energized to reconnect line 114 to the T terminal to permit the east-west signals to enter terminal 112. The east-west voice signals produce, within terminal unit 112, a command signal which, together with the voice signal are fed to transmitter 110 for transmission to radio receiver 107 at the west location. At the west station the voice and command signals are fed into terminal unit 103 wherein the command signal $c$ is separated out and fed to relay 102. Relay 102 having been energized connects west line 101 to the L position. The east-west circuit is now complete. A more detailed description of the invention will be given in consideration of FIG. 2, which follows.

Figure 2:
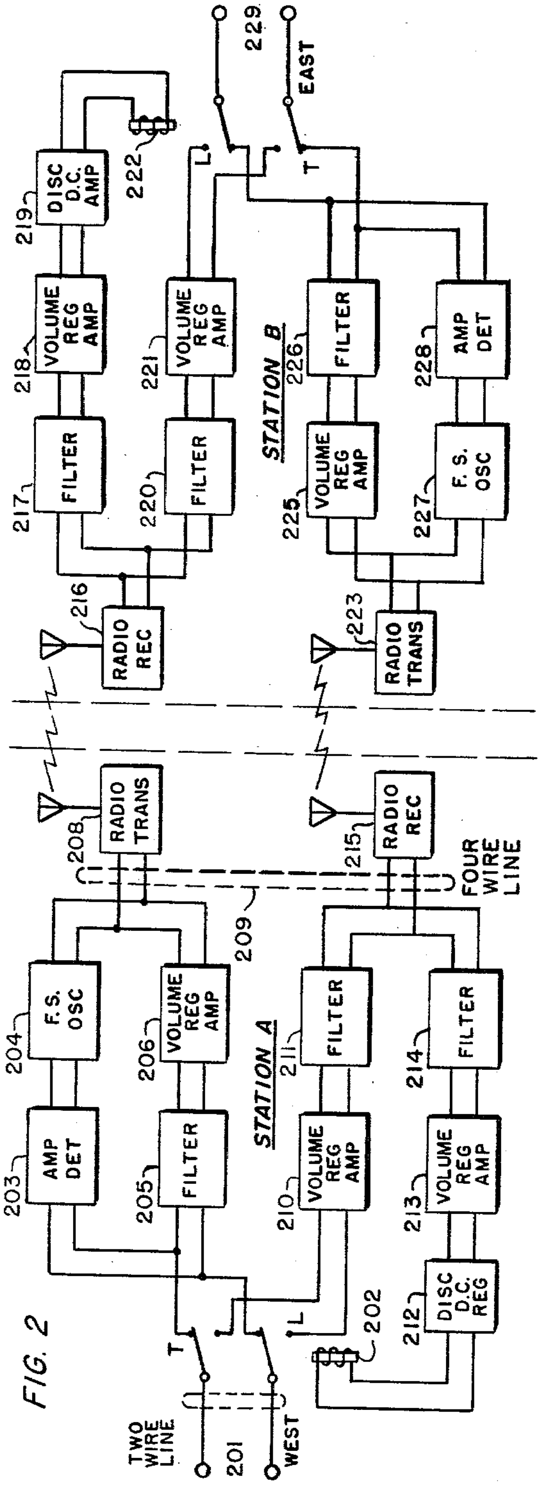
FIG. 2 shows diagrammatically, and in part schematically, one modification of a two-wire four-wire communications system in accordance with the present invention.

Referring now to FIG. 2, the invention is shown embodied in an east-west communication system comprising Station A and Station B. Intermediate the switched two-wire line 201 and the four-wire line 209 at Station A are the elements comprising the terminal unit of the present invention. In the unenergized condition of relay 202, line 201 is connected to a voice channel comprising a filter 205, and a voltage regulating amplifier 206. The voltage regulating amplifier 206 feeds radio transmitter 208. Filter 205 may be of any well-known low-pass or notch rejection type which functions to remove from the voice signal that part of the frequency portion which is utilized for the command tone. The voice signal *v* from line 201 is also fed to the amplifier-detector 203 which amplifies and rectifies the voice signal to provide a D.-C. voltage for shifting the frequency of the frequency-shift audio oscillator 204.

In one embodiment of the invention the oscillator frequency was selected as 1200 cycles per second, with a frequency shift of 100 cycles per second. Other frequencies within or outside the voice frequency being transmitted may be employed. The output of the frequency shift oscillator 204 is connected to the four-wire send line to combine with the voice signal to provide the input to transmitter 208. The signal comprising the voice and command components is transmitted to a distant Station B where it is intercepted by receiver 216. At Station B the output of the receiver is fed into a command channel comprising: a filter 217, a limiter amplifier 218, and to a control signal discriminator amplifier 219, and to a voice channel comprising a low pass filter 220 and a voltage regulating amplifier 221. Filter 217 may be either a high-pass filter or a band-pass type which will pass only the frequencies utilized for the command signal. Amplifier 218 is of the limiter type which removes amplitude variations from the command signal. The command signal control frequency is measured by the discriminator. In the case under consideration the frequency would be termed "Listen" and the output of the discriminator turns the D.C. amplifier portion of 219 "on" energizing relay 222. The voice signal *v* passes to the east two-wire line to complete the west-to-east connection. It will be noted that during the time that the west subscriber is talking east cannot seize control of the circuit, but when the local user (west) pauses, the distant user can seize control and a reversal of the functions takes place. When east stops talking relay 222 becomes de-energized to connect line 229 to the "talk" T position so that speech signals from east will pass through filter 226, through voltage regulating amplifier 225 to transmitter 223. The voice signal is also fed to amplifier detector 228 to produce a frequency shifting voltage in audio frequency shift oscillator 227. The output of 227 provides the input for transmitter 223. The signal radiated by transmitter 223 is intercepted by radio receiver 215. The output of 215 feeds the voice portion of the signal through filter 211 and amplifier 210, and the command portion through filter 214, limiter 213, and discriminator amplifier 212 to produce an actuating current for relay 202. Through the action of the relay 202 line 201 is connected to the "listen" position and the east-to-west circuit is completed.

Control action is always possible as long as the four-wire portion of the circuit is usable on a four-wire speech basis. The tone frequency transmitted by the frequency shift audio oscillators 204 and 227 of FIG. 2 is termed the "talk" frequency (or the command-to-talk). During the idle periods both relays will be in the de-energized or "talk" positions so that either station may initiate the operation of the circuits. Loss of four-wire continuity is indicated to the user by the presence of noise. The complete absence of noise or speech indicates to the user that he may talk and be heard at the distant end of the circuit. Signals cannot cross over from the four-wire receive path to the four-wire send path, and there is no likelihood of echo or feed-through effects.

No hybrid balancing is required in the operation of FIG. 2 since hybrid circuits are not utilized; nor does the system rely on the voice currents directly to perform the required switching functions. Since the two-wire or four-wire lines will perform satisfactorily over a wide range of impedances and losses, the principal factor for switching reliability is the form of command circuit utilized in connection with these that provide the high degree of reliability achieved. The command control channel is immune to noise since frequency-shift keying techniques are employed. The selective filters provide a still further degree of immunity. Where the four-wire circuit involves radio transmission an exceptionally high degree of positive control may be achieved through the utilization of diversity reception. This will be considered more fully in connection with FIG. 4 of the drawings.

Figure 3:
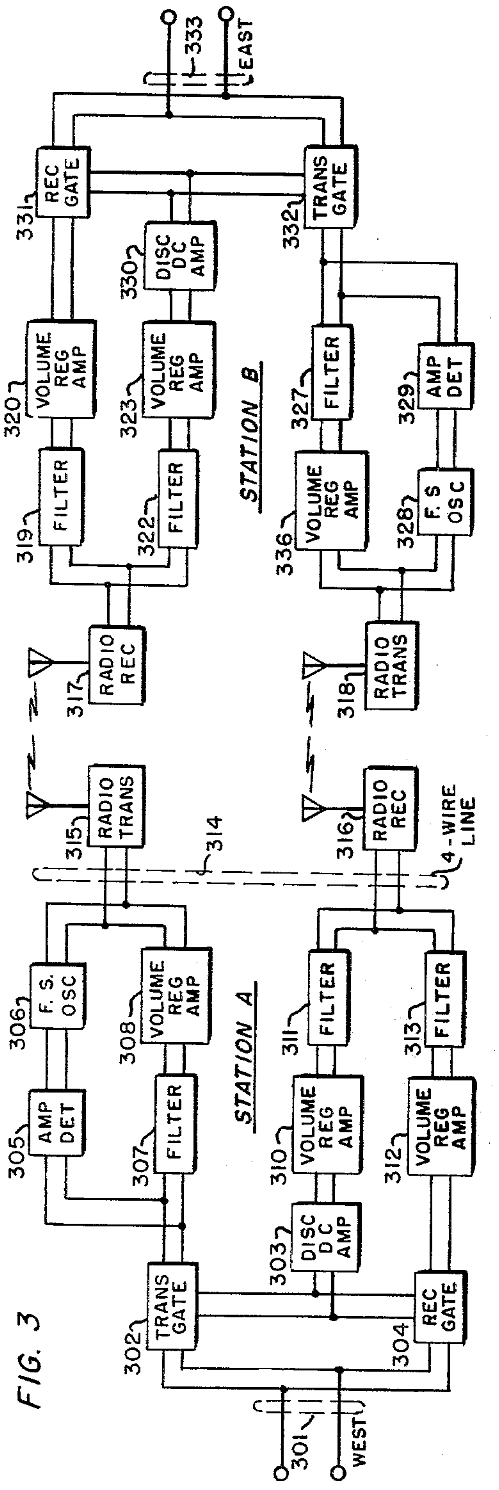
FIG. 3 shows diagrammatically a further modification of the communication system in FIG. 2.

FIG. 3 is a further modification of the two-wire four-wire converter in accordance with the invention. In this modification the relays 202 and 222 of FIG. 2 have been replaced by solid-state switches represented by discriminator 303 and gates 302 and 304 at the west end, and by discriminator 330 and gates 331 and 332 at the east end. The operation is entirely electronic. The operation of the gates is such that whenever a listen command is received the receive gate is opened and the transmit gate is closed; and whenever a transmit command is received the transmit gate is opened and the receive gate is closed. The operation of the arrangement depicted by FIG. 3 is as follows: When the system is idle the transmit gates 302 and 332 are in the open condition, and receive gates 304 and 331 are in the closed condition. When the west subscriber talks the voice signal passes through gate 302, filter 307 and amplifier 308 to transmitter 315; simultaneously with the signal entering filter 307 it is also fed through amplifier-detector 305 into frequency shift oscillator 306. The output of frequency shift oscillator 306 is also fed into transmitter 315 to provide a command signal. The combined voice and command signals are received by receiver 317 at the east terminal where the command signal is diverted by means of filters 319 and 322 to volume regulating amplifier 323 to produce in the output of discriminator amplifier 330 a voltage which opens receive gate 331 and thus permits the passage of the voice signal passing through filter 319, amplifier 320, on to the two-wire line 333. During this time the transmit gate 332 is closed. When the west subscriber stops talking the system reverts to its idle condition and east may proceed to talk. Since in the idle condition gate 332 is open, east's voice signals pass through filter 327 and amplifier 336 to transmitter 318. Simultaneously the voice signals also actuate amplifier-detector 329 to cause the frequency shift oscillator 328 to produce a command signal which combines with the voice signal at the input to transmitter 318 for transmission. At Station A the combined voice and command signals are intercepted by radio receiver 316. In the output of the receiver the voice and command signals are again separated by means of filters 313 and 311. The command signal passes through filter 311, volume regulating amplifier 310 into discriminator-amplifier 303 the output of which opens the receive gate 304, thus permitting the voice signal which is passing through filter 313, and amplifier 312 to go out over the two-wire line 301.

Figure 4:
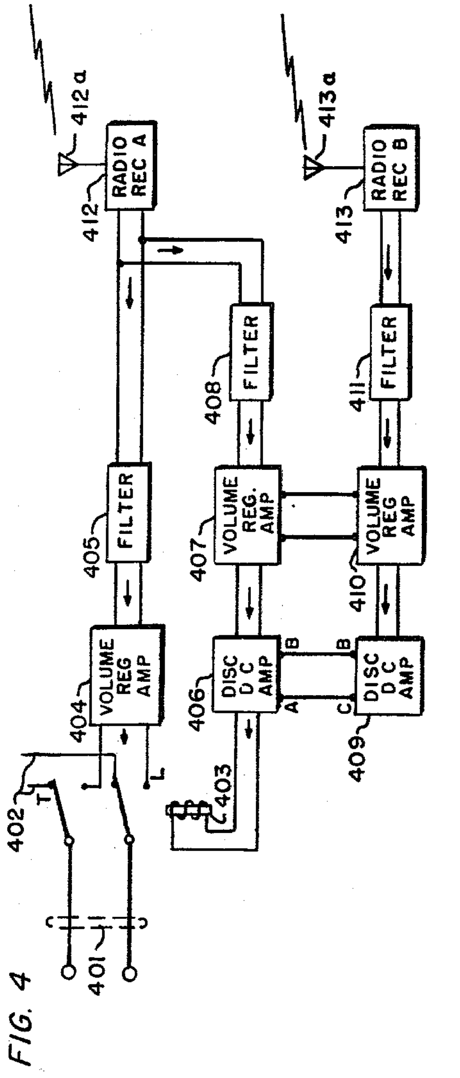
FIG. 4 illustrates a form of diverse reception for use with the communication system in accordance with the invention.

Although the invention as exemplified by FIGS. 1, 2 and 3 provides a much greater degree of reliability than heretofore possible with prior art systems, the switching can be made even more positive by the use of a radio diversity feature as shown in FIG. 4. The diversity technique is frequently utilized in high-frequency radio telegraph communications to reduce the effects of fading. Its use, however, with a two-wire four-wire system in the manner hereinafter described is believed novel.

FIG. 4 shows a second receiver 413 having an antenna 413*a* which antenna is physically separated from the antenna 412*a* of radio receiver 412 by several wavelengths. Receiver 412 feeds filter 405 and volume regulating amplifier 404 to provide a normal voice channel. The "normal" command signal channel is now interconnected with a second command signal channel fed by the output of receiver 413. The composite output of receiver 413 is filtered by filter 411 to remove the voice signals. The AGC busses of volume-regulating amplifiers 407 and 410 are tied together as indicated. The output of amplifier 410 passes on to the discriminator 409 which is connected in series with the output of discriminator 406 which in turn operates the D.-C. amplifier of 406. The net effect of this arrangement is that the stronger signal control tone will determine the decision that relay 403 makes as to the "T" or "L" positions. The stronger tone will reduce the gain of the opposite volume regulating amplifier in order to reject the effects of noise or interference. The principle of space diversity which takes advantage of the fact that the signals intercepted by widely-separated receiving antennas do not fade at both antennas is too well understood by those skilled in the art to require further explanation.

Figure 5:
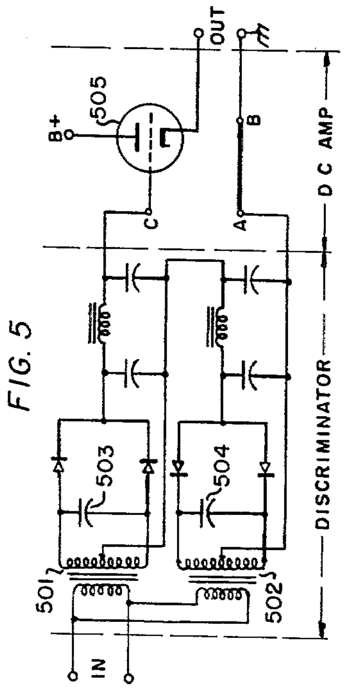

FIG. 5 illustrates schematically a typical discriminator-amplifier which may be utilized in the several embodiments of the invention hereinbefore disclosed. Transformer 501 secondary is shunted by condenser 503 and is tuned to an upper frequency $f_1$; and transformer 502 is shunted by condenser 504 and is tuned to a lower frequency $f_2$. In this particular arrangement $f_1$ would be the "talk" frequency, and $f_2$ would be the "listen" frequency. The D.-C. output of the discriminator is amplified by D.-C. amplifier 505. When utilized in a diversity system of the type shown in FIG. 4, the strap A–B is removed and the two discriminators 406 and 409 of FIG. 4 wired in series connection. The point *"c"* is connected as shown in FIG. 5.

Figure 6:
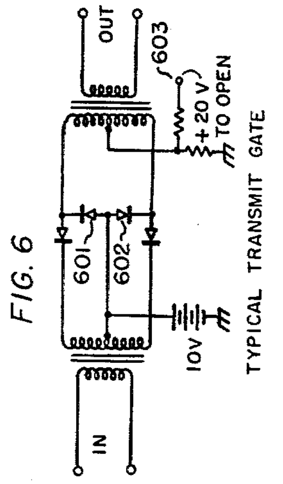
FIGS. 5, 6, 7 and 8 are typical schematic diagrams of a discriminator-D.-C.-amplifier, a transmit gate, a receive gate, and a volume regulating amplifier, respectively, which may be used in practice of the invention.
Figure 7:
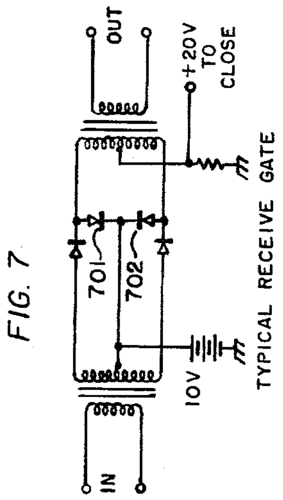

Typical solid-state transmit and receive gates are shown in FIGURES 6 and 7 respectively. With the voltage values indicated, a D.-C. voltage from the D.-C. amplifier of 20 volts will open the transmit gate. In FIG. 6 the rectifiers 601 and 602 are poled so that the gate is normally closed. In FIG. 7 a plus 20 volt D.-C. voltage will close the receive gate.

Figure 8:
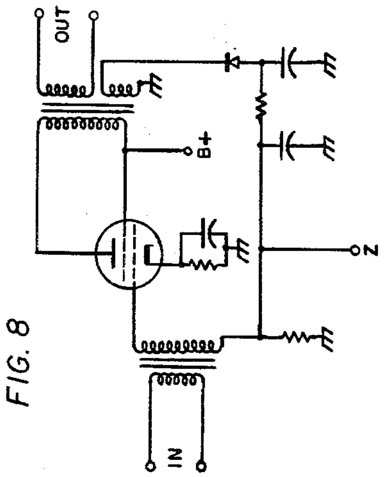

FIG. 8 illustrates schematically a type of volume regulating amplifier which may be utilized in the practice of the invention. The point "Z" is the tie point for interconnecting the AVC systems of the amplifiers.

Obviously many modifications and variations of the present invention are possible in the light of the above teachings. It is therefore to be understood, that within the scope of the appended claims, the invention may be practiced otherwise than as specifically described.

What is claimed is:

1. In a communication system comprising first and second stations a two-wire circuit coupled to each of said first and second stations, a four-wire circuit between said stations providing two separate channels for communication, one for each direction between the stations, and means for switching the two-wire circuits at each station between two positions, one coupling said two-wire circuit to one pair of said four-wire circuit or to the other of said pair of said four-wire circuit, said means comprising means at each station for generating a continuous command signal with a frequency shift in response to the transmission of a signal from the station, means at the other station responsive to the frequency shift signal transmitted thereto from said first station for causing said two-wire circuit to be connected to the other of the pair of said four-wire circuit and responsive to the absence of frequency shift in said continuous command signal for returning the connection to said first pair of said four-wire circuit.

2. A communication system according to claim 1 wherein said four-wire circuit comprises a radio link portion.

3. In a two-way voice communication system comprising a first station, a second station, a first and second communication channel interconnecting said stations, a third communication channel; means at said first station comprising a command-signal generator for producing a continuous no-voice command signal of a predetermined frequency, means responsive to a voice signal for shifting the frequency of said command signal, means for combining said voice and command signals for transmission over said first communication channel; means at said second station for switching said third channel to either one of said two channels, said last named means being responsive to said continuous no-voice command signal frequency to connect said third channel to said second communication channel, and to the shifted command signal frequency to connect said third channel to said first channel.

4. A two-way communication system according to claim 3 wherein said means for switching comprise electronic gate means.

5. In a communication system having a first station and a second station, a two-wire circuit connected to each of said stations, a four-wire circuit forming two channels between said stations, one for each direction of communication, and means for switching the two-wire circuit at each station to one or the other of said channels of said four-wire circuit comprising means at each station for generating a continuous command signal for transmission to said other station, means responsive to the transmission of audio frequency signals from a station to shift the frequency of said continuous command signal, and means at said other station responsive to the frequency shift of said continuous command signal for causing the operation of said switching means at said other station for connecting its two-wire circuit to the channel over which the communication signals are being transmitted.

6. In a two-way voice communication system having a first two-wire circuit, a second two-wire circuit, a four-wire circuit comprising first and second communication channels between said first and second two-wire circuits, a control system for shifting the second two-wire circuit from said first to said second communication channel in response to an incoming voice signal over said first two-wire circuit, comprising: A source of continuous control signals, means responsive to the presence of an incoming voice signal over said first two-wire circuit for changing the frequency of said continuous control signal by a predetermined amount, means for transmitting the voice and continuous control signals over said second communication channel in the direction of said second two-wire circuit, means responsive to the frequency change of said control signals for interrupting the circuit between said first communication channel and said second two-wire circuit, and for completing the circuit between the second communication channel and said second two-wire circuit, thereby permitting the passage of the voice signals from said first two-wire circuit to said second two-wire circuit over said second communication channel.

7. A communication system according to claim 6 wherein said four-wire line comprises a radio link portion.

8. A two-way signalling system comprising a first two-wire circuit, a second two-wire circuit, a four-wire circuit between the ends of said first and second two-wire circuits comprising a radio relay portion, control means for switching said second two-wire circuit from one to the other pair of said four-wire circuit, a source of control signal having a predetermined idle frequency, means responsive to an incoming voice signal on said first two-wire circuit for shifting the frequency of said continuous control signal by a predetermined amount, means for connecting the output of said source of control signal to a pair of said four wires of said four-wire circuit, a receiver adjacent said second two-wire circuit for intercepting the voice and control signals, switching means for connecting said second two-wire circuit to one or the other pair of wires of said four-wire circuit, and means responsive to a shift in said continuous control signal for actuating said switch from one position to another position to connect said second two-wire circuit to the other pair of wires of said four-wire circuit, thereby permitting the passage of the voice signal from said first two-wire circuit to said second two-wire circuit over said other pair of wires of said four-wire circuit.

9. In a two-way telephone system a first station, a second station, a four-wire circuit between said stations to provide two paths adapted for voice transmission, one path for each direction, a two-wire circuit adapted for voice transmission in opposite directions therealong connected to each of said first and second stations; means for switching said two-wire circuit from one to the other of said two paths of said four-wire circuit at said second station comprising means for generating a continuous command signal at said first station; said means for generating being responsive to voice signals for shifting the frequency of said continuous command signal, and means for transmitting said command signal to said second station; means at each station for detecting said command signal, said means for detecting including means for energizing said means for switching, thereby connecting the two-wire circuit at said other station to said other pair of said four-wire circuit.

10. In a two-way communication system having a first station, a second station, a two-wire circuit for transmission in opposite directions, a four-wire circuit between said stations providing two communication circuits one for each direction; means for switching said two-wire circuit at said second station from one to the other of said two communication circuits, comprising means at said first station for generating a continuous command signal, means responsive to voice signals at said first station for shifting the frequency of said continuous command signal for a predetermined amount, means at said second station for detecting said frequency shift in said command signal, and means responsive to said detection of frequency shift for disconnecting said two-wire circuit at said second station from one of said two communication circuits and connecting it to the other of said two communication circuits.

11. A two-way signalling system comprising a first two-wire circuit, a second two-wire circuit, a four-wire circuit between said first and second two-wire circuits comprising a wire portion and a radio relay portion having a transmitter; control means for switching said second two-wire circuit from one to the other pair of said four-wire circuit comprising: a source of continuous control signal having a predetermined idle frequency, means responsive to the presence of an audible signal on said first two-wire circuit for shifting the frequency of said control signal by a predetermined amount, means for connecting the output of said source of control signal to the transmitter of said radio relay, a radio receiver in said radio relay for intercepting the control signals from said transmitter; switching means, means connecting the output of said receiver to said switching means, said means connecting comprising means responsive to a shift in said continuous control signals for energizing said switch.

12. In combination a first two-wire circuit, a second two-wire circuit, two pairs of circuits forming a four-wire circuit between said first and second circuits comprising a wire portion and a radio link portion and a control system for switching said second two-wire circuit to either pair of said four-wire circuit comprising: a source of continuous control signal, means responsive to voice signals on said first two-wire circuit for shifting the frequency of said continuous control signal, means for feeding said continuous control signal to a transmitter of said radio link; radio receiving means in said radio link for intercepting the signal from said transmitter, said receiving means comprising a first and second radio receiver each associated with an antenna in a space-diversity arrangement; means for connecting the output of said first radio receiver to one pair of said four-wire circuit and to a control-signal discriminator, means for feeding the continuous control signal output from said second receiver to said control-signal discriminator, said discriminator providing an output responsive to the stronger control signal output between said first and second receivers; a circuit shifting means for selectively connecting said second two-wire circuit to either pair of said four-wire circuit; said circuit-shifting means being responsive to the output of said control-signal discriminator for shifting the second two-wire circuit from one pair of said four-wire circuit to the other pair of said four-wire circuit when the continuous control signal frequency is shifted due to the presence of voice signals in said first two-wire circuit.

References Cited by the Examiner

UNITED STATES PATENTS

| | | | |
|---|---|---|---|
| 2,206,146 | 7/40 | Wright | 179—170.4 |
| 2,968,718 | 1/61 | McKesson | 325—56 |

FOREIGN PATENTS

| | | |
|---|---|---|
| 526,405 | 6/31 | Germany. |
| 352,098 | 7/31 | Great Britain. |

ROBERT H. ROSE, *Primary Examiner.*

WALTER L. LYNDE, *Examiner.*